March 24, 1936. O. W. DIEFFENBACH 2,035,304
CELLULOSE TUBE
Filed Jan. 24, 1934
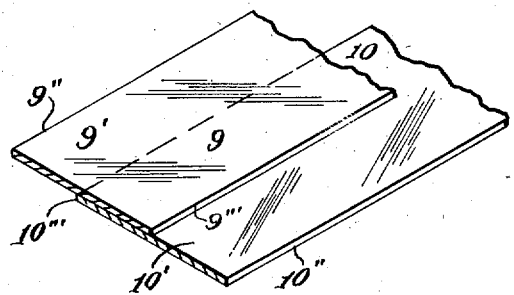
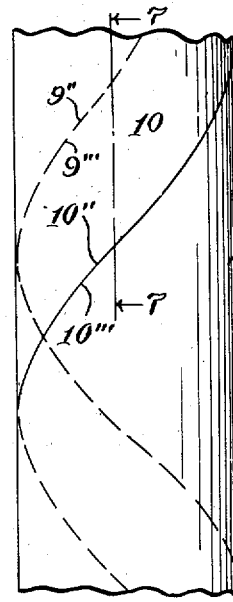 
Fig.4. Fig.5. Fig.6.
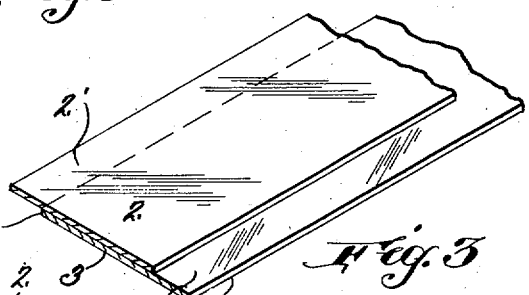
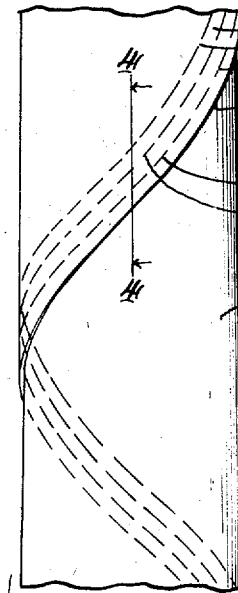 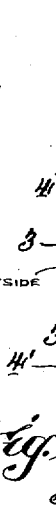
Fig.1. Fig.2. Fig.3.
Inventor
Otto W. Dieffenbach
By Edwin T. Hannibal
Attorney Patented Mar. 24, 1936

2,035,304

UNITED STATES PATENT OFFICE 2,035,304

CELLULOSE TUBE

Otto W. Dieffenbach, Baltimore, Md.

Application January 24, 1934, Serial No. 708,064

7 Claims. (Cl. 138—78)

REISSUED

The invention relates to the tubes particularly adapted for use in partaking of light beverages and other drinks and commonly known as drinking straws, though the tubes of the invention are capable of more general use. The inventive feature relates to the tube as an article of manufacture.

The tubes used as drinking straws at the present time include natural hollow straws and tubes made of paper and consisting of a helically wound strip treated with paraffin or some equivalent waterproofing agent.

The natural straws have been found objectionable on account of their small capacity and also on account of the presence of soluble materials which impart an undesired flavor to the beverage. They have been largely displaced by paper tubes which can be produced in large quantities at a less expense and can also be made of any desired diameter, but the paper tubes have a considerable heat capacity and conductivity so that they change the temperature of the beverage and are to a considerable degree sensitive to the action of the various liquids of which the beverages are composed and if left in the liquid, they become limp and objectionable on account of their unpleasing appearance. If permitted to remain moist for any considerable period, they collapse completely so that they can not be used.

A further objection is that paper is absorbent and not moistureproof, so that it must be coated to make it available for this purpose. The paraffin with which it is treated is subject to chemical combination with the carbonic acid contained in the carbonated beverages which form a large proportion of the drinks dispensed in this way so that a considerable quantity of carbonic acid gas is released in the tube by the action of the paraffin. Thus, the tube when in use contains not its full volume of liquid but a mixture of liquid and gas which lacks the flavor of the beverage when the gas is retained in the liquid and released in the stomach and has a harmful tendency due to absorption of the gas in the lungs.

An important object of the present invention is to overcome these difficulties by the production of a non-absorbent tube which is of increased resistive qualities so that it is not attacked by the liquid, thus avoiding the premature discharge of carbonic acid.

The invention also has as an object the provision of a transparent tube of resilient material cheap enough to be available as a drinking straw, of pleasing appearance and having a highly polished surface, thus reducing the tendency to collect dust and germs.

It is also of interest that the tube is formed of a material which is relatively thin and of low heat capacity and conductivity and inherently moistureproof and non-absorbent, resisting for an indefinite period not only the action of water but all of the various liquids and gases contained in the drinks to be dispensed.

The tube of the invention has been made of regenerated cellulose or of cellulose esters produced in sheet form, which material is cut into strips and wound helically on a mandrel, the successive turns of the helix being overlapped and joined as to their overlapped edges by heating the tube after it has been wound, the material used in the production of applicant's straw in the preferred form being as already pointed out, self adhesive when heated, regenerated cellulose or regenerated cellulose hydrate being most easily available for treatment in this way.

It is further of interest that while the drinking straws or tubes can be made of a single layer of sheet cellulose material, this term being used to identify the cellulose compounds or derivatives adapted for use in this way, the spiral ribs or thickened portions due to the overlapping of the successive turns of the helix being utilized as a reinforce to strengthen the tube, the tubes thus manufactured of a single layer in order to be sufficiently stiff to stand up in use, must be of such thickness as to require the use of sheet cellulose material of a thickness which would make the tube relatively expensive as compared to the paper tubes now in use. However, the invention contemplates the manufacture of a single layer, as well as of any other number of layers.

With this fact in view, applicant's preferred form of tube is composed of two or more thicknesses. This tube on account of the multiple layers has an increased stiffness as compared to the tubes composed of a single layer of this material. By means of the multiple layers of the present invention a tube is produced in accordance with the invention, containing less material and at the same time being more rigid than the single thickness tube. This tube can be produced on a satisfactory expense basis, it costs little more than the paper tubes now in use and is at the same time a much more pleasing and satisfactory product.

Various details and features of the product, method and the machine by which the manufacturing method is practiced are made apparent in the drawing and the description which follows.

In the accompanying drawing I have illustrated a tube or drinking straw embodying the features of the invention in the preferred form together with a machine by which the method of the invention may be carried into effect.

In the drawings:

Figure 1 is a fragmentary elevation on an enlarged scale of a straw made in accordance with the invention in the preferred form.

Figure 2 is a section on a still further enlarged scale, the same being taken on the line 4, 4 in Figure 1.

Figure 3 is a fragmentary perspective view showing the arrangement of the strips as fed to the mandrel in the production of the tube or straw as shown in Figure 1.

Figure 4 is a fragmentary elevation corresponding to Figure 1, showing a modified form of drinking straw or tube on an enlarged scale.

Figure 5 is a section on a still larger scale taken on the line 7, 7 in Figure 4.

Figure 6 is a fragmentary perspective view corresponding to Figure 3 showing the arrangement of the strips as fed to the mandrel in the production of the tube or straw shown in Figure 4.

Referring to the drawings by numerals, each of which is used to indicate the same or similar parts in the different figures, the invention provides a drinking tube of regenerated cellulose or cellophane esters or other equivalent transparent cellulose material or derivative, the terms cellulose material and cellulose derivative being used interchangeably as identifying cellulose compounds adapted to be made into these homogeneous, non-fibrous, transparent, moistureproof, non-absorbent sheets which are flexible, hard and resilient, and to distinguish these materials which are referred to loosely by the public as "cellophane", from paper, the use of which in the manufacture of drinking straws or tubes is not contemplated by this applicant. The material used in the manufacture of the tubes described, to the best advantage should be self adhesive when heated but the use of adhesives with these materials is known to those familiar with transparent wrappings of these cellulose derivatives.

While the tube may be made of a single strip of material, the use of a plurality of strips overlying each other is believed to have important advantages not only in providing a tube of sufficient stiffness with a minimum of material, but also in making available for this purpose a grade of thin transparent sheet cellulose esters which is in general use for wrapping and similar purposes.

Having particular reference to the drawing, the illustration, Figures 1 and 2, comprises a tube 1 shows on a magnified scale, the stock article used as a drinking straw being approximately 1/8" in diameter. This tube is shown as made of two strips of transparent cellulose, the inner strip being indicated by reference character 2 and the outer strip by reference character 3. These strips are together wound about the axis of the tube in the form of a helix, the successive turns of the helix being overlapped between the lines 4, 4'. This overlapping arrangement of the successive turns of the helix, is a feature of the preferred practice of the invention, although other methods of manufacture are easily conceivable in the light of this disclosure and as contemplated within the broader scope of the invention.

In the finished tube shown in Figure 1, the strip 3 overlies the strip 2 and is offset so that the strip 3 overlaps the strip 2 at one side at 3' and the strip 2 overlaps or extends beyond the strip 3 at the opposite side at 2'. By the overlapping of the successive turns of the helix in the manner shown in Figure 2 and indicated in Figure 1, the joint 5 between the successive turns of the helix is formed at the center, of four thicknesses of the material and above and below the center, of three thicknesses incident to the overlap of the edge portions 3' and 2', as best shown in Figure 3 which illustrates the manner of feeding the two strips 2 and 3. This gives in the tube a stiffening rib or thickened portion which extends helically along and around the tube as best illustrated in Figures 1 and 2, the adjacent edges of the two overlying strips being indicated in the form of four parallel helical lines running along and around the tube as shown in Figure 1. The outer and lower line indicating the exposed edge of the overlap 3' is shown at 4' and the opposite edge is shown at 4, the intervening edges of the strips 3 and 2, where they occur within the joint being indicated by reference characters 5' and 5''.

It will be noted that while the strip 3 forms the outside of the tube, the strip 2 being inside, the strip 2 overlies the strip 3 in Figure 3. This is due to the fact that in the machine shown the strips are fed to the under side of the mandrel bringing the top strip 2 on the inside in rolling or winding the tube.

Figures 4 and 5 illustrate a modified form of tube made of a plurality of layers, the tube walls being of uniform thickness, the edges of the strips being abutted together as shown in Figure 5. The tube shown in Figure 4 is indicated by reference character 8, the arrangement of the multiple strips as fed to the mandrel to be hereinafter described, being shown in Figure 6. The strip which is on top in Figure 6 indicated by reference character 9, is fed next to the mandrel, and is therefore on the inside of the finished tube, the strip 10 which is beneath in Figure 6 forming the outside surface of the finished tube. The strips are in each instance fed to the under side of the mandrel from the side toward the observer and turned around the mandrel in clockwise direction as hereinafter described.

In the construction shown in Figure 4, the overlap of the successive turns of the helix is equal to the offset of the overlying multiple strips 9 and 10, as shown in Figure 6, and is fed to the mandrel, the strips being preferably fed together. The free edge portion of the offset of strip 10 in Figure 6 is indicated by reference character 10' and the free edge or overlap of the strip 9 on the other side by reference character 9', the extreme edges of these free edge portions on one side being indicated by reference character 9'' and 10''. respectively, and the offset edges by 9''' and 10'''. In this instance the overlap of the successive turns of the helix being equal to the width of these free edge portions 9' and 10' or the offset of the strips, the edge 9'' on one side in the finished tube abuts against the free edge 9'''' of the next turn of the helix, edge 9'''' being on the other side of the strip, and the edge 10'' of the outside strip 10 abuts the free edge 10'''' in the corresponding manner so that what have been termed the free edge portions 9' and 10' of the multiple strips 9, 10 overlap and register as shown in Figures 6, forming a tube with walls of uniform thickness, the joints being formed by the abutting of the edges 10″ and 10‴ on the outside and the edges 9″ and 9‴ on the inside. The abutting edges 10″ and 10‴ on the outside of the tube are shown in full lines in Figure 4, the edges 9″ and 9‴ on the inside being indicated by a dotted line parallel to the full line. Both lines extend along and around the tube in the form of a helix. The tube constructed in accordance with Figures 4, 5 and 6, has some advantages over the previous construction because of the smooth, continuous flat inner and outer surfaces, the joints at 9″, 9‴, and 10″, 10‴ being completely closed by heating the tube, and while this tube does not have the full advantages of the reinforcing feature of the type previously described, it is of increased stiffness and resistive qualities as compared to a tube made of a single thickness and is cheaper because of the extra expense of a sheet cellulose of sufficient thickness to be used in making a single layer tube. The waste product from the sheet cellulose used in wrapping is of a satisfactory thickness for the construction of multiple layer tubes as described.

While it is not essential to the production of a commercial tube, provision may be made for spraying the tube with cellulose esters or similar drying solution, whereby a hard lustrous coating would be provided on the outer surfaces of the tube. While the heating step is of great advantage, producing a tube of more satisfactory and permanent construction at a much lower cost.

It is of interest that when self adhesive material is used and the tube is sealed by this means, the tube shrinks in diameter in heating and the shrinkage of the tube together with the self adhesiveness of the material which results from heating has the effect of joining tightly together by welding or sticking, both the overlapping edges of the successive turns of the helix and the overlying strips of material.

The material of which the tube of the invention is composed must be distinguished from pure cellulose which is white and amorphous and absorbent, being used for filter papers but not being adapted to applicant's purpose, and it must be distinguished from paper, which, according to the accepted meaning of this term, though it is mainly cellulose or cellulose compounds and in some instances translucent, is fibrous and, like pure cellulose, highly absorbent and otherwise affected by moisture so that it collapses and shrinks when wet, and not suited to applicant's purpose, as, to make it even temporarily moistureproof, it requires coating with paraffin or the equivalent, which is objectionable. The materials of which applicant's tubes are made are obtainable from the same source as the "cellophane" wrappings now in use. The sheets referred to as satisfactory for use in this way are of cellulose compounds, also referred to herein for convenience as cellulose materials or derivatives, the chemical terms not being necessary to identify them as they are well known to the trade. The materials which are adapted to this purpose being nonabsorbent, moistureproof, resilient and tough, as well as transparent and insoluble in practically all beverages, part only of these materials, particularly the material referred to in the trade as regenerated cellophane, are self adhesive when heated, this property of the material being essential only in the preferred form of the tube.

The tube of the invention is substantially transparent and neutral, and insoluble in any kind of beverage, at drinking temperature so that it does not affect the taste of the drink and does not collapse. It is also resilient and possessed of a hard, smooth glossy surface both on the inside and outside and it is of attractive appearance and adapted to most satisfactory use in conducting beverages, having little, if any, tendency to accumulate dust and microbes. It is also of low heat capacity and conductivity so as to effect practically no change of the temperature of the drink and, it retains its resilience and therefore its shape indefinitely even when immersed for long periods in any of the liquids used as beverages.

I have thus described specifically the tube of my invention, the description being specific and in detail in order that the manner of constructing, applying, operating and using the invention may be fully understood, however, the specific terms herein are used in a descriptive rather than in a limiting sense, the scope of the invention being defined in the claims.

What I claim as new and desire to secure by Letters Patent is:

1. A tube adapted for use as a drinking straw composed of homogeneous sheet cellulose derivative which is self adhesive when heated, the tube being composed of a plurality of overlapping strips of the said sheet material wound in the form of a helix and having the adjacent edges of the consecutive turns of the helix overlapped and sealed by the self adhesive properties of the material.

2. A tube adapted for use as a drinking straw composed solely of transparent sheet cellulose material, which is self adhesive when heated, the tube being composed of a plurality of overlapping strips of the said sheet material wound in the form of a helix and having the adjacent edges of the consecutive turns of the helix overlapped and sealed by the self adhesive properties of the material, the overlying strips being offset as to their edges.

3. A tube adapted for use as a drinking straw composed solely of sheet cellulose material which is self adhesive when heated, the tube being composed of two overlying strips of the said sheet material wound in the form of a helix and having the adjacent edges of the consecutive turns of the helix overlapping and sealed by the self adhesive properties of the material, the overlying strips of material being offset as to their edges by a margin equal to the overlap of the consecutive turns of the helix, thus forming a tube wall of uniform thickness.

4. A tube adapted for use as a drinking straw composed solely of transparent sheet cellulose material which is self adhesive when heated, the tube being composed of a plurality of overlying strips of the said sheet material of the standard thickness of wrapping sheets wound in the form of a helix and having the adjacent edges of the consecutive turns of the helix overlapped and sealed by the self adhesive properties of the material.

5. A tube adapted for use as a drinking straw composed of transparent sheet cellulose material which is self adhesive when heated, the tube being composed of said sheet material in strip form wound in the form of a helix and having the adjacent edges of the consecutive turns of the helix overlapped and sealed by the self adhesive properties of the material.

6. A tube for use as a drinking straw and the like comprising a smooth, hard, non-fibrous, resilient, thin transparent sheet, material in strip form and homogeneous throughout, of non-absorbent cellulose derivative, said strip material being helically arranged and the adjacent edges of consecutive turns of the helix being overlapped and sealed.

7. A tube for use as a drinking straw composed of transparent sheet cellulose material which is substantially moistureproof, and non-absorbent, hard and resilient, the same being in strip form, the strip material being arranged in the form of a helix and having the adjacent edges of the consecutive turns of the helix overlapped and sealed.

OTTO W. DIEFFENBACH.

CERTIFICATE OF CORRECTION.

Patent No. 2,035,304.

March 24, 1936.

OTTO W. DIEFFENBACH.

It is hereby certified that error appears in the printed specification of the above numbered patent requiring correction as follows: Page 2, first column, line 33, strike out the word "esters"; and that the said Letters Patent should be read with this correction therein that the same may conform to the record of the case in the Patent Office.

Signed and sealed this 23rd day of June, A. D. 1936.

Leslie Frazer

Acting Commissioner of Patents.

(Seal)

like comprising a smooth, hard, non-fibrous, resilient, thin transparent sheet, material in strip form and homogeneous throughout, of non-absorbent cellulose derivative, said strip material being helically arranged and the adjacent edges of consecutive turns of the helix being overlapped and sealed.

7. A tube for use as a drinking straw composed of transparent sheet cellulose material which is substantially moistureproof, and non-absorbent, hard and resilient, the same being in strip form, the strip material being arranged in the form of a helix and having the adjacent edges of the consecutive turns of the helix overlapped and sealed.

OTTO W. DIEFFENBACH.

CERTIFICATE OF CORRECTION.

Patent No. 2,035,304.       March 24, 1936.

OTTO W. DIEFFENBACH.

It is hereby certified that error appears in the printed specification of the above numbered patent requiring correction as follows: Page 2, first column, line 33, strike out the word "esters"; and that the said Letters Patent should be read with this correction therein that the same may conform to the record of the case in the Patent Office.

Signed and sealed this 23rd day of June, A. D. 1936.

Leslie Frazer

Acting Commissioner of Patents.

(Seal)

CERTIFICATE OF CORRECTION.

Patent No. 2,035,304.  March 24, 1936.

OTTO W. DIEFFENBACH.

It is hereby certified that error appears in the printed specification of the above numbered patent requiring correction as follows: Page 2, first column, line 33, strike out the word "esters"; and that the said Letters Patent should be read with this correction therein that the same may conform to the record of the case in the Patent Office.

Signed and sealed this 23rd day of June, A. D. 1936.

Leslie Frazer (Seal)  Acting Commissioner of Patents.